United States Patent
Bowden et al.

(10) Patent No.: US 6,509,117 B1
(45) Date of Patent: Jan. 21, 2003

(54) BATTERY COMPRISING MANGANESE DIOXIDE HAVING A HIGH POWER COEFFICIENT

(75) Inventors: William Bowden, Nashua, NH (US); Klaus Brandt, Wellesley, MA (US); James J. Cervera, Sandy Hook, CT (US); Hyoun Sook Choe, Northboro, MA (US); Rimma A. Sirotina, Waltham, MA (US); Joseph Sunstrom, New Milford, CT (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/563,447

(22) Filed: May 1, 2000

(51) Int. Cl.$^7$ ................................. H01M 4/50
(52) U.S. Cl. ..................................... 429/224
(58) Field of Search ................... 429/224, 229

(56) References Cited

U.S. PATENT DOCUMENTS 5,569,564 A    10/1996  Swierbut et al.
6,207,322 B1 *  3/2001  Kelsey et al. ............... 429/206
6,214,198 B1    4/2001  Andersen et al.

FOREIGN PATENT DOCUMENTS

EP      0964467 A2    12/1999
WO      WO00/24071    4/2000

OTHER PUBLICATIONS

A.H. Thompson, "Electromechanical Potential Spectroscopy: A New Electrochemical Measurement" *J. Electrochem. Soc*: Electrochemical Science and Technology vol. 126, No. 4:608–616 (1979).

Y. Chabre and J. Pannetier, "Structural and Elecetrochemical Properties of the Proton /γ–MnO$_2$ System" *Prog. Solid st. Chem.*: vol. 23. 1–130 (1995).

Chabre, Y.P., "Step Potential Electrochemical Spectroscopy of Proton Intercalation in γ/ε=MnO$_2$," *J. Electrochem. Soc.* vol. 138, No. 1, Jan. 1991.

International Search Report dated Dec. 4, 2001.

* cited by examiner

*Primary Examiner*—Stephen Kalafut
*Assistant Examiner*—M. Wills
(74) *Attorney, Agent, or Firm*—Fish & Richardson P.C.

(57) ABSTRACT

A battery, a primary alkaline battery, has a cathode including manganese dioxide, carbon, and a binder. The manganese dioxide is selected to have a high power coefficient to provide the battery capable of high current discharge.

18 Claims, 6 Drawing Sheets

FIG. 6

BATTERY COMPRISING MANGANESE DIOXIDE HAVING A HIGH POWER COEFFICIENT

BACKGROUND

The invention relates to batteries.

Batteries, such as alkaline batteries, are commonly used electrical energy sources. Generally, a battery contains a negative electrode, typically called the anode, and a positive electrode, typically called the cathode. The anode contains an active material (e.g., zinc particles) that can be oxidized; and the cathode contains an active material (e.g., manganese dioxide) that can be reduced. The anode active material is capable of reducing the cathode active material. In order to prevent direct reaction of the anode material and the cathode material, the anode and the cathode are electrically isolated from each other by a separator.

When a battery is used as an electrical energy source in a device, such as a cellular telephone, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

Some devices, such as digital cameras and cellular telephones, can demand high power from batteries. In such applications, it is desirable for the batteries, e.g., primary alkaline batteries, to have good performance and long lifetimes at high current discharge.

SUMMARY

The invention relates to using stepped potential electrochemical spectroscopy ("SPECS") to select a manganese dioxide for high current discharge batteries. The SPECS results yield a dimensionless parameter, termed herein the "power coefficient", which can be used to predict the high current discharge performance of a cathode material.

Preferably, a high current discharge $MnO_2$ has a power coefficient greater than 3.6, preferably greater than about 3.8, and more preferably greater than about 4.0 or about 4.2. As used herein, manganese dioxide, or $MnO_2$, refers to a "nominal" manganese dioxide, or $MnO_{2-x}$, where $0 \leq x \leq 0.1$. An example of manganese dioxide is gamma-$MnO_2$, an intergrowth of pyrolusite and ramsdellite used in batteries.

The invention also relates to batteries, such as primary alkaline batteries, LeClanche cells, and $ZnCl_2$ cells, having cathodes including the manganese dioxide described above. The cathodes can further include carbon particles and a binder. The batteries can include an anode having zinc as the active material.

Other features, objects, and advantages of the invention will be apparent from the drawings, description, and claims.

DETAILED DESCRIPTION

Figure 1:
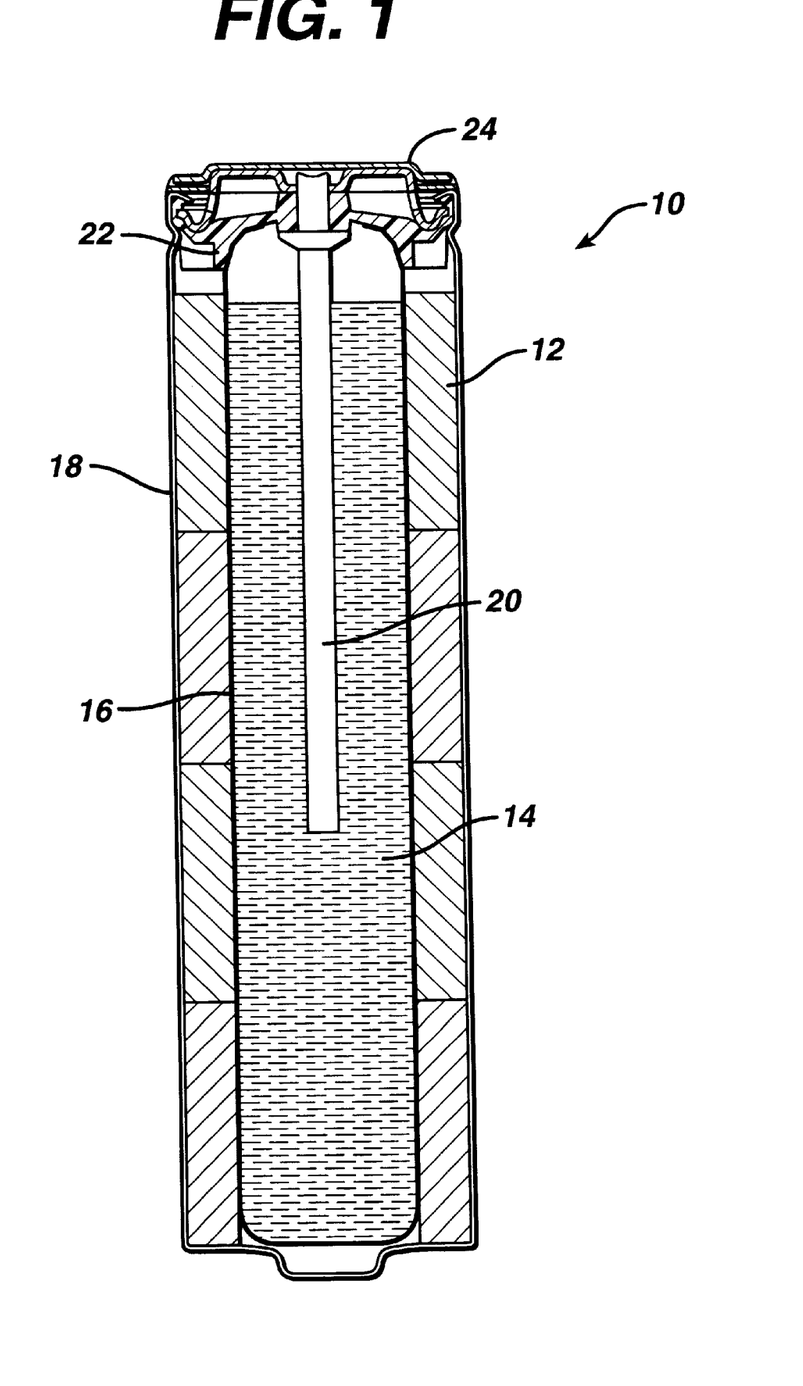
FIG. 1 is a side-sectional view of a battery.

Referring to FIG. 1, battery 10 includes a cathode 12, an anode 14, a separator 16, and a cylindrical housing 18. Battery 10 also includes a current collector 20, a seal 22, and a negative metal top cap 24, which serves as the negative terminal for the battery. Cathode 12 is in contact with housing 18, and the positive terminal of battery 10 is at the opposite end of battery 10 from the negative terminal. An electrolytic solution is dispersed throughout battery 10. Battery 10 can be, for example, a AA, AAA, AAAA, C, or D battery.

Cathode 12 includes manganese dioxide, carbon particles, and a binder.

The manganese dioxide can be electrolytically-synthesized $MnO_2$ (EMD), or chemically-synthesized $MnO_2$ (CMD), or a blend of EMD and CMD. Preferably, the manganese dioxide is EMD having a high power coefficient. Generally cathode 12 may include, for example, between 80% and 90%, and preferably between 86% and 88%, of manganese dioxide by weight.

The manganese dioxide is a high-current discharge active material selected by screening $MnO_2$ using SPECS. SPECS has been described in, for example, A. H. Thompson, *Electrochemical Potential Spectroscopy: A New Electrochemical Measurement*, J. Electrochemical Society 126(4), 608–616 (1979); Y. Chabre and J. Pannetier, *Structural and Electrochemical Properties of the Proton/γ-$MnO_2$ System*, Prog. Solid St. Chem. 23, 1–130 (1995); and references therein, which are all hereby incorporated by reference.

Figure 2:
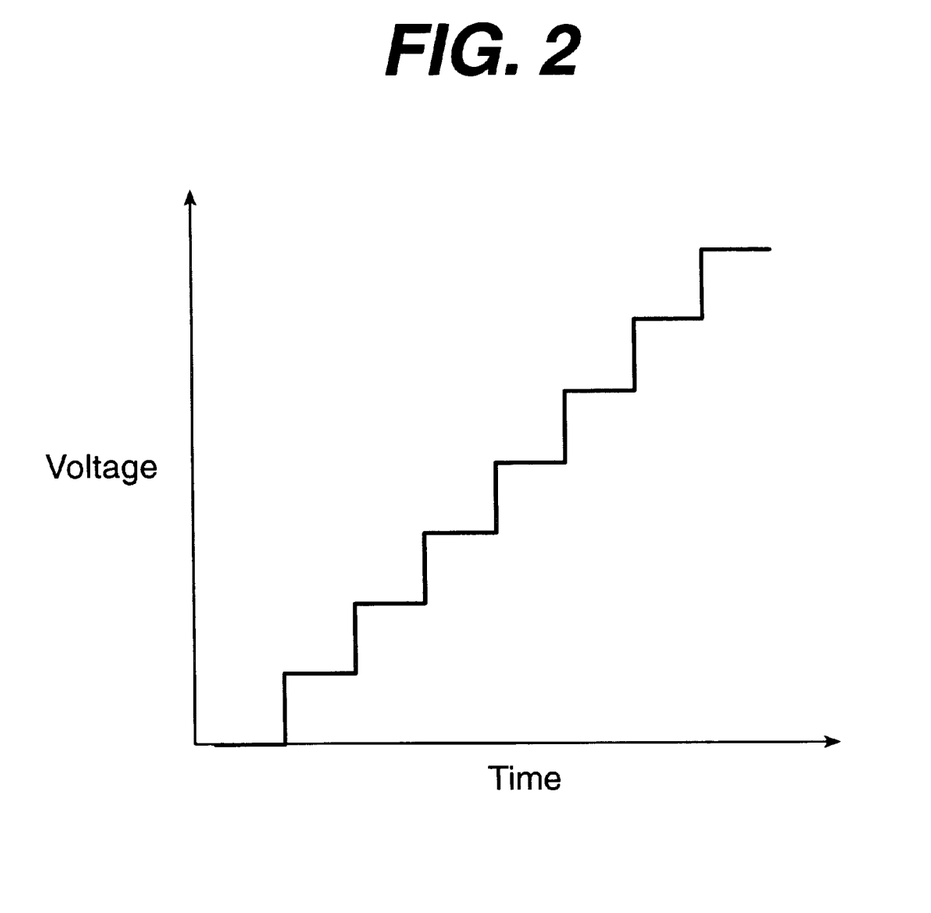
FIG. 2 is a qualitative plot of voltage vs. time as can be used in stepped potential electrochemical spectroscopy ("SPECS")

Generally, SPECS involves applying a series of increasing or decreasing potential steps to a cell containing a test material. Each potential step can be applied for a predetermined dwell time. As shown in FIG. 2, this produces a "voltage staircase" profile of the applied voltage as a function of time.

Figure 3:
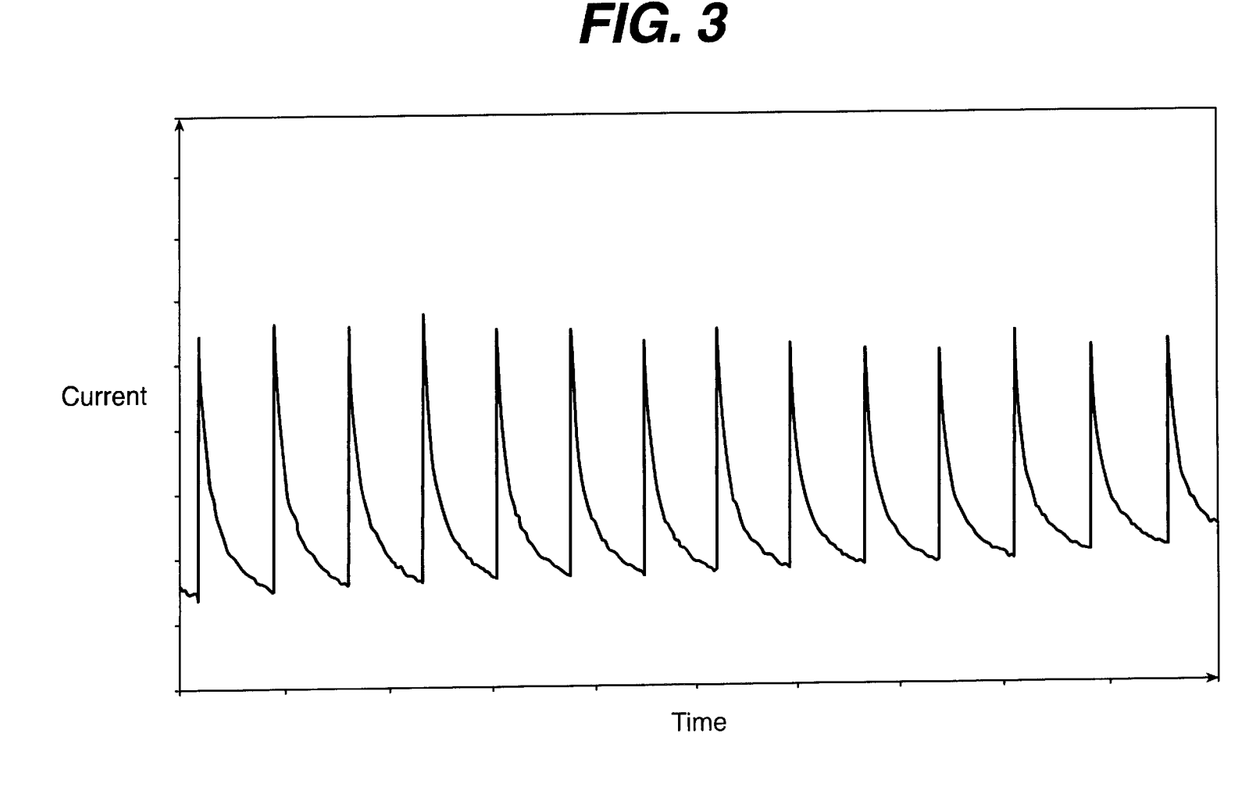
FIG. 3 is a qualitative plot of current vs. time as can be obtained from SPECS.

The current can also be measured as a function of time for each voltage step, e.g., the current can be continuously measured or measured at some predetermined interval. FIG. 3 depicts the current-time plot for an exemplary sample of $MnO_2$. As shown in FIG. 3, for each voltage step the cell generally discharges a maximum current, $I_{max}$, and then decays to a minimum current, $I_{min}$.

Using the standard relationship that power is equal to current multiplied by voltage, a plot of the current as a function of time can be converted to a plot of power as a function of time. Moreover, by using the relationship between voltage and time depicted in FIG. 3, a plot of power as a function of time can be converted to a plot of power as a function of voltage. For example, a plot of the maximum current as a function of time (FIG. 3) and the minimum current as a function of time (FIG. 3) can be converted to a plot of maximum power as a function of voltage (FIG. 4) and a plot of the minimum power as a function of voltage (FIG. 4), respectively.

Figure 4:
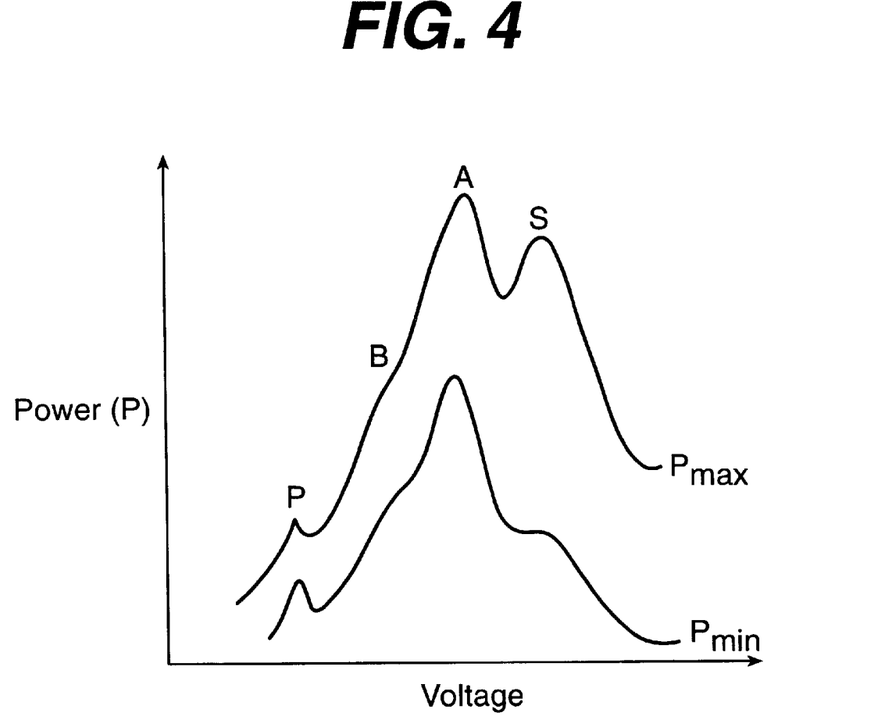
FIG. 4 is a qualitative plot of maximum and minimum power vs. voltage as can be obtained from SPECS.

As shown in FIG. 4, the power-voltage plot of a sample of $MnO_2$ can exhibit four features or peaks, commonly labeled P, B, A, and S. Without wishing to be bound by theory, feature P, generally at about 1.1 V, is believed to correspond to the reduction of $Mn^{4+}$ located in the pyrolusite (rutile) phase of gamma-$MnO_2$. Features B and A, generally at about 1.2–13 V and at about 1.3 V, respectively, are believed to correspond to the reduction of the ramsdellite phase of gamma-$MnO_2$. Feature S, generally at about 1.45 V, is believed to correspond to the reduction of surface states located at microtwinning defects. Different samples of manganese dioxide can have different absolute and/or relative intensities for the P, B, A, and/or S peaks in their respective power-voltage plots. For example, a sample of $MnO_2$ can have a relatively high S peak and a relatively high P peak, or a relatively low S peak and a relatively high P peak, or various other combinations.

The peaks in a maximum power-voltage plot can provide useful information when selecting manganese dioxide for use in cathode 12 of high-current discharge battery 10. In particular, when used in high-current discharge battery 10, cathode 12 should contain manganese dioxide having a high power coefficient. As used herein, the term "power coefficient" refers to the ratio of the heights or intensities of the S and P peaks (S/P) in the maximum power-voltage plot of a sample of manganese dioxide. For high-current discharge battery 10, the manganese dioxide contained in cathode 12 preferably has a power coefficient greater than about 3.6, or greater than about 3.8, or greater than about 4.0, or greater than about 4.2, or greater than about 4.0. It is to be noted that, because the power coefficient is a dimensionless parameter, it can be used to evaluate different samples of $MnO_2$ to identify and to predict whether a given sample of manganese dioxide may be good for high-current discharge applications.

In general, the SPECS data, e.g., current, power and/or capacity, for a given type of manganese dioxide increases as the weight a sample of the manganese dioxide increases. Therefore, to compare the SPECS data for samples of manganese dioxide having different weights, the SPECS data should be normalized to the weight of each sample. For example, to compare the P peaks in the maximum power-voltage plots of two samples of manganese dioxide having different weights, the P peak for the first sample should be divided by the weight the first sample, and the P peak for the second sample should be divided by the weight of the second sample.

An EMD having a high power coefficient can be prepared according to standard electrodeposition techniques. A deposition cell having two graphite cathodes (approximately 2×4×0.375 inches) (available from SGL Caron, St. Mary's, Pa.), a sandblasted titanium anode (approximately 3.5× 1.75×0.25 inches) (available from Timet, East Windsor, Conn.), about 0.2 to about 1.2 M $MnSO_4$ (from $MnSO_4.H_2O$ powder reagent, available from A.C.S., Spectrum Quality Products, Inc.), preferably about 0.5 M $MnSO_4$, and about 0.1 to about 1.0 M $H_2SO_4$ (certified A.C.S. Plus, available from Fisher Chemicals, Fisher Scientific), preferably about 0.25 M $H_2SO_4$, was used. The deposition temperature was about 90 to about 100° C., preferably about 98° C. Using a 2L polypropylene bottle as the reaction vessel, the reactant flow rate was about 10 to about 100 mL/hr, preferably about 25 mL/hr. The current density was about 3 to about 20 $A/ft^2$, preferably about 6 $A/ft^2$. The deposition time was up to one month.

Electrodeposition generated hydrogen gas on the carbon cathode and deposited EMD on the titanium anode. After electrodeposition, the EMD was mechanically removed from the anode and neutralized, e.g., with NaOH. The EMD was then ground to size, e.g., to about <80 microns, and used to form a cathode.

Numerous experimental conditions for SPECS can also be used to obtain the plots discussed herein. Generally, the experimental conditions to be selected include the voltage step and a limiting condition, which can include dwell time and a limiting current, e.g., min. Typically, dwell time is selected as the limiting condition because data manipulation can be convenient. The conditions are preferably selected so that the resulting plots, e.g., power vs. voltage and capacity vs. voltage, have well-resolved P, B, A, and S peaks. The rate of current discharge should generally allow observation of the sharp P feature. Also, because the B peak can affect the magnitude of the P peak, which is used to calculate the power coefficient, the rate of discharge should also generally be fast enough to show the presence of the kinetically hindered B peak (the shoulder near 1.2 V) and detailed enough with regard to voltage step to reveal the shoulder. Generally, voltage steps of greater than about 20 mV/hr can cause shifts in peak voltages that can complicate data interpretation. Voltage steps greater than about 10 mV may results in plots having an unresolved B shoulder, whereas small voltage steps and short sample intervals can provide good resolution, at some cost to absolute accuracy. Accordingly, preferred experimental conditions can include voltage steps of about 2.5 mV to about 10 mV, e.g., about 5 mV. Dwell times that are too short, e.g., about 15 minutes, provide inadequate resolution, but dwell times that are too long, e.g., greater than about 6 hours, require an undue length of time for measurements. Therefore, preferred dwell times are typically from about 30 minutes to about 2 hours.

The carbon particles in cathode 12 can be, for example, non-expanded graphite particles, expanded graphite particles, or a blend of non-expanded graphite particles and expanded graphite particles. The graphite can be synthetic or non-synthetic, or a blend of synthetic and non-synthetic.

The non-expanded graphite particles preferably have an average particle size of less than about 20 microns, more preferably from about 2 microns to about 12 microns, and most preferably from about 5 microns to about 9 microns. Non-synthetic, non-expanded graphite particles can be obtained from, for example, Brazilian Naceonal de Grafite (Itapecirica, MG Brazil (MP-0702X).

The expanded graphite particles preferably have an average particle size of less than 40 microns, more preferably between 18 microns and 30 microns, and most preferably between 24 microns and 28 microns. Expanded graphite particles may be purchased, for example, from Chuetsu Graphite Works, Ltd. (Chuetsu grades WH-20A and WH-20AF) of Japan.

Cathode 12 may include for example, between 3% and 7%, preferably between 4% and 6.5% carbon particles by weight. Generally, between 25% and 75%, or 35% and 65%, or 40% and 60%, or 45% and 55% of the carbon particles are non-expanded graphite particles, with the remainder being the expanded graphite particles.

Examples of binders include polyethylene powders, polyacrylamides, Portland cement and fluorocarbon resins, such as PVDF and PTFE. An example of polyethylene binder is sold under the tradename Coathylene HA-1681 (available from Hoescht). The cathode may include, for example, between 0.1 percent to about 1 percent of binder by weight.

Cathode 12 can include other additives. Examples of these additives are disclosed, for example, in U.S. Pat. No. 5,342,712, which is hereby incorporated by reference. Cathode 12 may include, for example, from about 0.2 weight percent to about 2 percent $TiO_2$ weight.

The electrolyte solution also is dispersed through cathode 12, and the weight percentages provided above and below are determined after the electrolyte solution has been dispersed.

Anode 14 can be formed of any of the standard zinc materials used in battery anodes. For example, anode 14 can be a zinc gel that includes zinc metal particles, a gelling agent, and minor amounts of additives, such as gassing inhibitor. In addition, a portion of the electrolyte solution is dispersed throughout the anode.

The zinc particles can be any of the zinc particles conventionally used in gel anodes. Examples of zinc particles include those described in U.S. Ser. Nos. 08/905,254, 9/115,867, and 09/156,915, which are assigned to application and are hereby incorporated by reference. The anode may include, for example, between 67% and 71% of zinc particles by weight.

Examples of gelling agents include polyacrylic acids, grafted starch materials, salts of polyacrylic acids, polyacrylates, carboxymethylcellulose or combinations thereof. Examples of such polyacrylic acids are Carbopol 940 and 934 (available from B. F. Goodrich) and Polygel 4P (available from 3V), and an example of a grafted starch material is Waterlock A221 (available from Grain Processing Corporation, Muscatine, Iowa). An example of a salt of a polyacrylic acid is Alcosorb G1 (available from Ciba Specialties). The anode may include, for example, from 0.1 percent to about 1 percent gelling agent by weight.

Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separator 16 can have any of the conventional designs for battery separators. In some embodiments, separator 16 can be formed of two layers of non-woven, non-membrane material with one layer being disposed along a surface of the other. To minimize the volume of separator 16 while providing an efficient battery, each layer of non-woven, non-membrane material an have a basic weight of about 54 grams per square meter, a thickness of about 5.4 mils when dry and a thickness of about 10 mils when wet. In these embodiments, the separator preferably does not include a layer of membrane material or a layer of adhesive between the non-woven, non-membrane layers. Generally, the layers can be substantially devoid of fillers, such as inorganic particles.

In other embodiments, separator 16 includes an outer layer of cellophane with a layer of non-woven material. The separator also includes an additional layer of non-woven material. The cellophane layer can be adjacent cathode 12 or the anode. Preferably, the non-woven material contains from about 78 weight percent to about 82 weight percent PVA and from about 18 weight percent to about 22 weight percent rayon with a trace of surfactant. Such non-woven materials are available from PDM under the tradename PA25.

The electrolytic solution dispersed throughout battery 10 can be any of the conventional electrolytic solutions used in batteries. Typically, the electrolytic solution is an aqueous hydroxide solution. Such aqueous hydroxide solutions include potassium hydroxide solutions including, for example, between 33 and 38 by weight percent potassium hydroxide, and sodium hydroxide solutions. The electrolyte can also include about 2 by weight percent zinc oxide.

Housing 18 can be any conventional housing commonly used in primary alkaline batteries. The housing typically includes an inner metal wall and an outer electrically non-conductive material such as heat shrinkable plastic. Optionally, a layer of conductive material can be disposed between the inner wall and the cathode 12. This layer may be disposed along the inner surface of wall, along the circumference of cathode 12 or both. This conductive layer can be formed, for example, of a carbonaceous material. Such materials include LB1000 (Timcal), Eccocoat 257 (W. R. Grace & Co.), Electrodag 109 (Acheson Colloids Co.), Electrodag 112 (Acheson) and EB0005 (Acheson). Methods of applying the conductive layer are disclosed in, for example, Canadian Patent No. 1,263,697, which is hereby incorporated by reference.

Current collector 20 is made from a suitable metal, such as brass. Seal 22 can be made, for example, of nylon.

The following examples are for illustrative purposes only and are not intended as limiting.

EXAMPLE 1

A cathode mix containing 300 mg of $MnO_2$ (Kerr-McGee Chemical Corp.), 150 mg of natural graphite (MP-0702X) (Naceonal de Grafite), and 25 mg of 38% KOH with 2% dissolved, was assembled into a housing (size DA635 can). The cathode mix was compacted into the can using a piston. The can and the piston were placed in a Carver press, and the mix was pressed under about 2 tons of pressure. The can was removed from the press, and the piston was removed from the can.

A separator was placed over the cathode. An excess of the above electrolyte solution containing slurried zinc powder and a Carbopol 940 slurrying agent was added to the housing. The zinc concentration was approximately twelve times greater than the concentration of the $MnO_2$, forming a cathode-limited cell.

Figure 5:
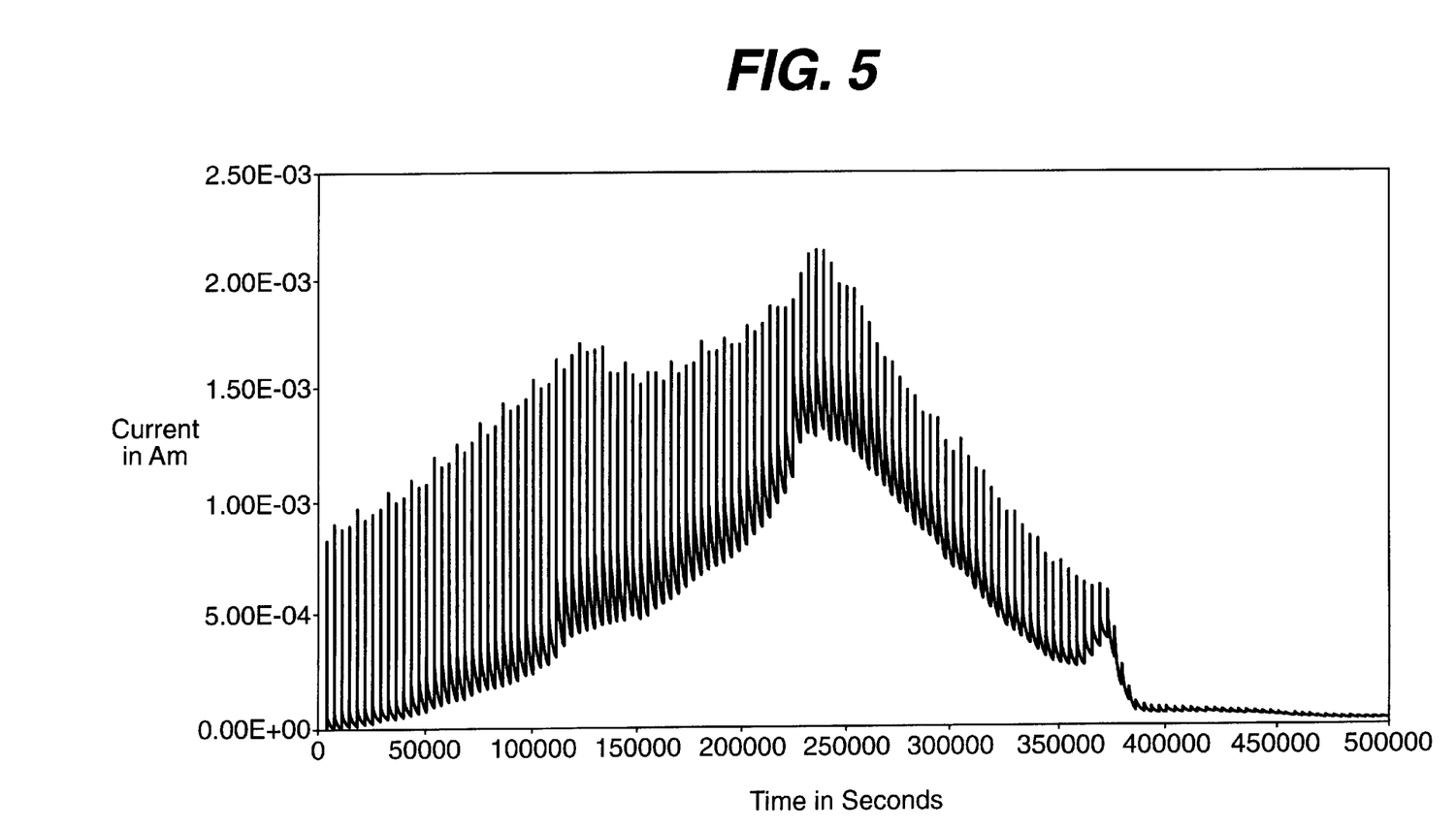
FIG. 5 is a plot of current vs. time as obtained from SPECS for an $MnO_2$ sample.
Figure 6:
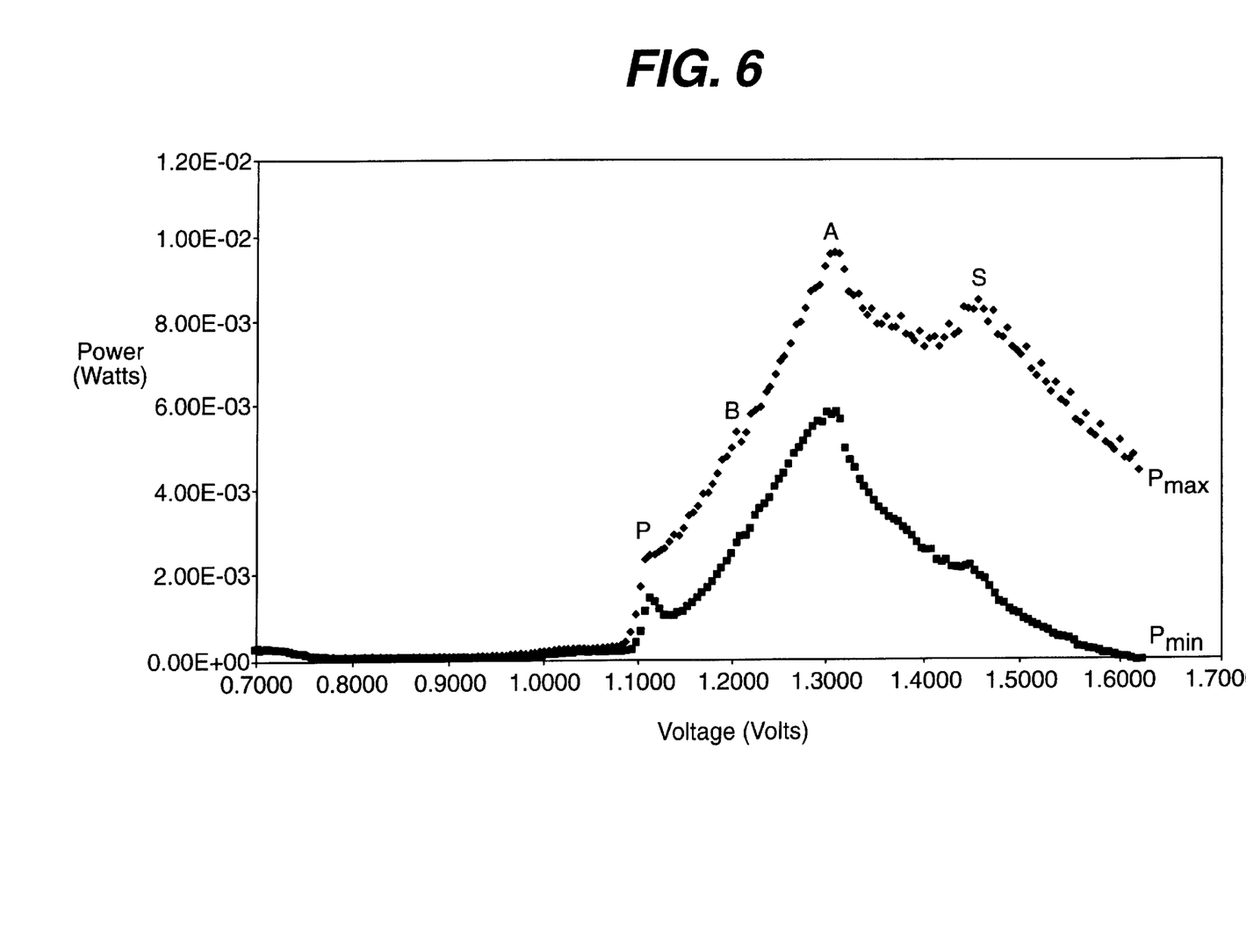
FIG. 6 is a plot of power vs. voltage as obtained from SPECS for an $MnO_2$ sample.

The cell was tabbed and discharged using a potentiostat (Arbin multistation) according to the "voltage staircase" function. The voltage step was 5 mV. The dwell time was 1 hr. Data points were collected approximately every two minutes. Plots of current vs. time, and maximum and minimum power vs. voltage are shown in FIGS. 5 and 6, respectively.

EXAMPLE 2

An example of battery 10 (AA) was prepared according to the following procedure.

The cathode included about 9.779 grams of manganese dioxide having a power coefficient greater than 3.6, 0.59 grams of the blend of expanded graphite and non-expanded graphite used in the previous example, 0.64 grams of 38% KOH, and about 0.3 weight percent of coathylene HA-1681. The anode included about 4.213 grams of zinc particles including 1.475 grams of Noranda P-25 zinc fines, about 50 ppm surfactant (RM 510, Rhone Poulenc) relative to zinc, and about 0.5 weight percent total gelling agent (Carbopol 940 and A221). The porosity of the cathode was about 25%, and the porosity of the anode was about 2.076 grams of zinc per cubic centimeter of anode. The separator was an outer layer of cellophane (purchased from UCB, Grade No. 300 P00.2 with a layer of non-woven material. The separator also includes an additional layer of non-woven material. The cellophane layer can be adjacent cathode 12 or the anode. Preferably, the non-woven material contains from about 78 weight percent to about 82 weight percent PVA and from about 18 weight percent to about 22 weight percent rayon with a trace of surfactant. Such non-woven materials are available from PDM under the trade name PA25. The battery also included an electrolyte of about 3.916 grams of an aqueous potassium hydroxide (about 35.5 weight percent potassium hydroxide with 2% dissolved ZnO) solution. A thin coating of EB005 (Acheson) was disposed between the outer wall of the battery and the outer periphery of the cathode.

Other embodiments are in the claims.

What is claimed is:

1. A cathode for a battery comprising manganese dioxide having a power coefficient greater than about 3.6.

2. The cathode of claim 1, wherein the power coefficient is greater than about 3.8.

3. The cathode of claim 1, wherein the power coefficient is greater than about 4.0.

4. The cathode of claim 1, wherein the power coefficient is greater than about 4.2.

5. The cathode of claim 1, wherein the power coefficient is greater than about 4.4.

6. The cathode of claim 1, further comprising carbon particles; and a binder.

7. The cathode of claim 6, wherein the cathode comprises:

about 80% to about 88% of manganese dioxide by weight;

about 3% to about 7% of carbon particles by weight; and about 0.1% to about 1% of the binder by weight.

8. A battery comprising:

a cathode comprising manganese dioxide having a power coefficient greater than about 3.6;

an anode;

a separator; and an electrolyte.

9. The battery of claim 8, wherein the power coefficient is greater than about 3.8.

10. The battery of claim 8, wherein the power coefficient is greater than about 4.0.

11. The battery of claim 8, wherein the power coefficient is greater than about 4.2.

12. The battery of claim 8, wherein the power coefficient is greater than about 4.4.

13. The battery of claim 8, wherein the battery is a primary alkaline battery.

14. The battery of claim 8, wherein the battery is a cylindrical battery.

15. The battery of claim 8, wherein the anode comprises zinc.

16. The battery of claim 8, wherein the cathode further comprises carbon particles and a binder.

17. The battery of claim 16, wherein the cathode comprises:

about 80% to about 88% of manganese dioxide by weight;

about 3% to about 7% of carbon particles by weight; and about 0.1% to about 1% of the binder by weight.

18. The battery of claim 15, wherein the cathode comprises:

about 80% to about 88% of manganese dioxide by weight;

about 3% to about 7% of carbon particles by weight; and about 0.1% to about 1% of the binder by weight.

* * * * *